US012738566B2

(12) United States Patent
Pitses et al.

(10) Patent No.: US 12,738,566 B2
(45) Date of Patent: Sep. 15, 2026

(54) INTEGRATED COOLING AND THERMAL RUNAWAY MITIGATION CONTAINER FOR POUCH BATTERY CELLS

(71) Applicant: GM GLOBAL TECHNOLOGY OPERATIONS LLC, Detroit, MI (US)

(72) Inventors: Eleni C. Pitses, Grosse Pointe Park, MI (US); Justin D. Benden, College Station, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 990 days.

(21) Appl. No.: 17/857,232

(22) Filed: Jul. 5, 2022

(65) Prior Publication Data

US 2024/0014466 A1 Jan. 11, 2024

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC ........... H01M 10/6568; H01M 10/613; H01M 10/653; H01M 2220/20
See application file for complete search history.

(56) References Cited

U.S. PATENT DOCUMENTS

2010/0279154 A1* 11/2010 Koetting ........... H01M 10/6556 429/50
2015/0037616 A1* 2/2015 Wyatt ................. H01M 10/613 429/153
(Continued)

FOREIGN PATENT DOCUMENTS

CN 110754005 A 2/2020
CN 111742441 A 10/2020
(Continued)

OTHER PUBLICATIONS

Cao, X., Wallace, W., Poon, C., & Immarigeon, J. P. (2003). Research and Progress in Laser Welding of Wrought Aluminum Alloys. I. Laser Welding Processes. Materials and Manufacturing Processes, 18(1), 1-22. https://doi.org/10.1081/AMP-120017586 (Year: 2003).*
(Continued)

*Primary Examiner* — Allison Bourke
*Assistant Examiner* — Verita E Grannum
(74) *Attorney, Agent, or Firm* — Quinn IP Law

(57) ABSTRACT

A pouch battery cell module includes a battery cell stack having first and second pouch battery cells and a thermally conductive and compliant material arranged between the battery cells. The module also includes a module container housing the first and second pouch battery cells and providing structural support therefor and including first, second, third, and fourth lateral walls, with each wall defining at least one coolant passage. Each of the first through fourth lateral walls is configured to direct out of the battery module container debris and gases emitted by at least one of the first and second pouch battery cells undergoing a thermal runaway event. The module container also includes non-structural fifth and sixth sides configured to eject to an external environment the debris and gases directed by the first
(Continued)

through fourth lateral walls. A method of assembling a pouch battery cell module is also disclosed.

18 Claims, 7 Drawing Sheets

(51) Int. Cl.
*H01M 10/625* (2014.01)
*H01M 10/653* (2014.01)
*H01M 50/224* (2021.01)

(52) U.S. Cl.
CPC ....... *H01M 10/653* (2015.04); *H01M 50/224* (2021.01); *H01M 2220/20* (2013.01)

(56) References Cited

U.S. PATENT DOCUMENTS

| | | | | |
|---|---|---|---|---|
| 2015/0044523 | A1 | 2/2015 | Weber et al. | |
| 2016/0211559 | A1* | 7/2016 | Frohnmayer | H01M 10/6556 |
| 2018/0175430 | A1* | 6/2018 | Modderno | H01M 8/04686 |
| 2019/0386273 | A1* | 12/2019 | Pflueger | H01M 50/317 |
| 2020/0006722 | A1* | 1/2020 | Tanner | H01M 10/6556 |
| 2020/0161725 | A1 | 5/2020 | Kalmbach | |
| 2020/0411930 | A1 | 12/2020 | Park | |
| 2021/0159559 | A1* | 5/2021 | Kawai | H01M 10/647 |
| 2025/0364635 | A1* | 11/2025 | Salim Shirazy | B60L 1/02 |

FOREIGN PATENT DOCUMENTS

| | | | | |
|---|---|---|---|---|
| CN | 113328197 | A | 8/2021 | |
| CN | 113381103 | A | 7/2022 | |
| KR | 20230170556 | A * | 12/2023 | H01M 50/242 |
| WO | WO-2022162237 | A1 * | 8/2022 | H01M 10/625 |

OTHER PUBLICATIONS

Machine translation of KR 20230170556 A (Year: 2022).*
Melançon, Stéphane. "Electric Vehicle Battery Cells Explained." Electric Vehicle Battery Cells Explained, May 6, 2022, www.laserax.com/blog/ev-battery-cell-types. (Year: 2022).*

* cited by examiner 24
36-2
28
34-2
36-2
62
62
42
44
32
50
26
34-1
36-1
26
28-1
28-2
28-3
34-1
34-3
32
36-3
48
6-6
64
Z
X
Y
34-4
P
30
36-4

INTEGRATED COOLING AND THERMAL RUNAWAY MITIGATION CONTAINER FOR POUCH BATTERY CELLS

INTRODUCTION

The present disclosure relates to a pouch battery cell container with integrated cooling and thermal runaway mitigation.

A battery module or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries. Batteries may, for example, be configured as cylindrical, prismatic, or pouch cells.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and cause the thermal runaway event to affect the entire battery array.

SUMMARY

A battery module includes a pouch battery cell stack having a first pouch battery cell and a neighboring second pouch battery cell and a thermally conductive and compliant or compressible material element arranged between the first and second pouch battery cells. The battery module also includes a battery module container configured to house the first and second pouch battery cells. The battery module container includes first, second, third, and fourth lateral walls. Each of the first through fourth lateral walls defines at least one coolant passage and is configured to provide structural support for the first and second pouch battery cells. Each of the first through fourth lateral walls is also configured to direct out of the battery module container debris and gases emitted by at least one of the first and second pouch battery cells undergoing a thermal runaway event. The battery module container also includes non-structural fifth and sixth sides configured to eject to an external environment the debris and gases directed by the first through fourth lateral walls.

Each of the first, second, third, and fourth lateral walls may be characterized by a cross-section including an inner wall having a first thickness and an outer wall having a second thickness. The inner wall and the outer wall may bracket or sandwich the coolant passage(s). The first thickness may be smaller than the second thickness.

The battery module container may include four joined aluminum extruded subsections, with each subsection defining at least a part of one of the first, second, third and fourth lateral walls.

In the cross-section of the battery module container each of the four aluminum extruded subsections may include a dog-leg shaped end configured to match up to and interface with an adjacent subsection.

The battery module may include first and second coolant manifolds mounted and fluidly connected to each of the first, second, third and fourth lateral walls. The first coolant manifold may be configured to receive a coolant, such as from an external coolant source, and distribute the coolant to the at least one coolant passage in each of the first, second, third and fourth lateral walls. The second coolant manifold may be configured to discharge the coolant from the at least one coolant passage in each of the first, second, third and fourth lateral walls, for example, to the external coolant source.

Each of the first and second coolant manifolds may be laser welded to the first, second, third and fourth lateral walls.

Each of the first and second coolant manifolds may include a coolant quick-connect port configured to establish fluid communication with an external coolant source.

The battery module may also include an electrically insulating, thermally conductive interface material arranged between the first pouch battery cell and the first lateral wall of the battery module container and between the second pouch battery cell and the second lateral wall of the battery module container.

The battery module may additionally include first and second current collectors having corresponding over-molded first and second polymer frames, wherein the first and second current collectors are configured to be electrically connected to the respective first and second pouch cells. The first polymer frame may be fixed to the non-structural fifth side and the second polymer frame may be fixed to the non-structural sixth side of the battery module container.

Each of the first and second pouch battery cells may include first and second tab connectors. The first tab connector of each of the first and second pouch battery cells may be attached to the first current collector and the second tab connector of each of the first and second pouch battery cells may be attached to the second current collector.

A method of assembling such a battery module is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as “above,” “below,” “upward,” “downward,” “top,” “bottom,”, “left”, “right”, etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
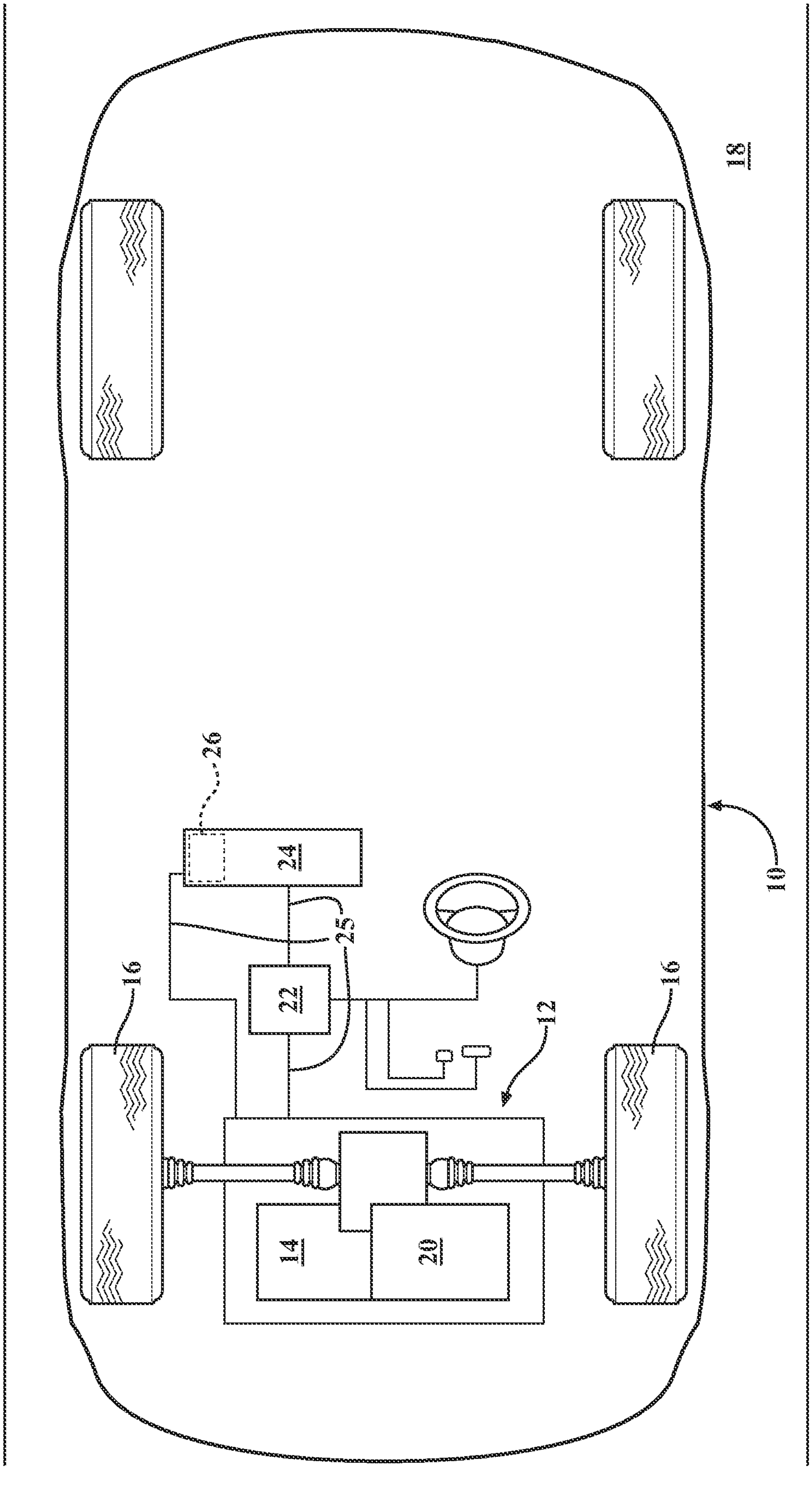
FIG. 1 is a schematic top view of an embodiment of a motor vehicle employing multiple power-sources and a battery pack having pouch battery cells arranged in module(s) configured to generate and store electrical energy.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery pack 24 configured to generate and store electrical energy through heat-producing electro-chemical reactions for supplying the electrical energy to the power-sources 14 and 20. The electronic controller 22 may be a central processing unit (CPU) that regulates various functions of the vehicle 10, or as a powertrain control module (PCM) configured to control the powertrain 12 to generate a predetermined amount of power-source torque T. The battery pack 24 may be connected to the power-sources 14 and 20, the electronic controller 22, as well as other vehicle systems via a high-voltage BUS 25. Although the battery pack 24 is described herein primarily with respect to a vehicle environment, nothing precludes the subject battery pack from being employed to power other, non-automotive systems.

Figure 2:
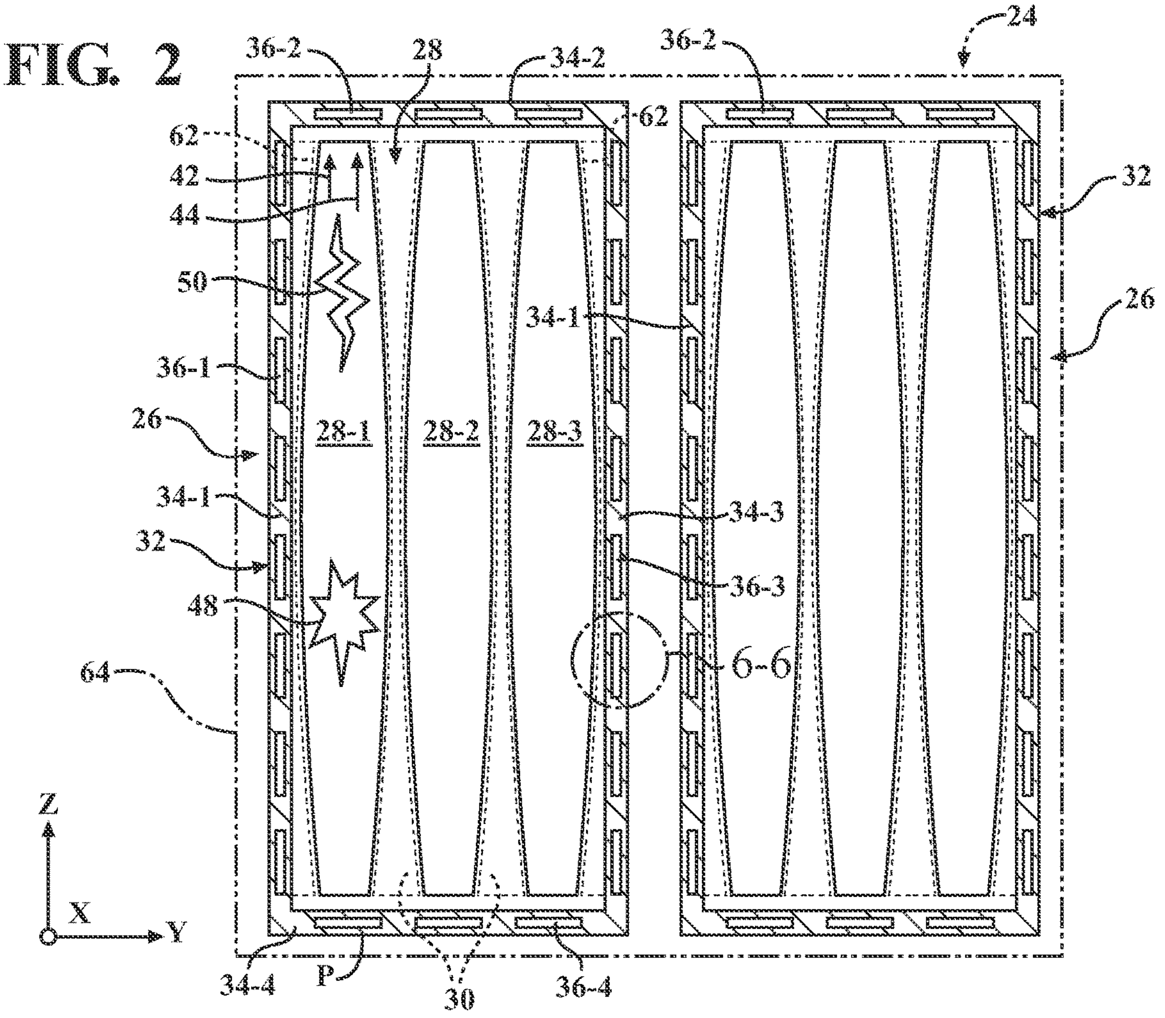
FIG. 2 is a schematic sectional front view of two battery modules, such as shown in FIG. 1, each having individual pouch battery cells arranged side by side inside a battery module container, according to the disclosure.

As shown in FIG. 1, the battery pack 24 may include one or more sections, such as pouch battery cell arrays or modules 26. As shown in FIG. 2, the battery module 26 includes a pouch battery cell stack 28 having a plurality of pouch battery cells, such as a first pouch battery cell 28-1, a neighboring, directly adjacent, second pouch battery cell 28-2, and a third pouch battery cell 28-3 neighboring the second pouch cell, each battery cell shown extending generally upward, i.e., in the Z direction, as seen in FIG. 2. Although three pouch battery cells are shown, nothing precludes the battery module 26 from having two pouch cells, such as the first and second cell 28-1, 28-2, or a greater number of analogous battery cells. A thermally conductive and compliant, i.e., compressible, material element 30 is arranged between each of the three pouch battery cells 28-1, 28-2, 28-3 in the stack 28. Although two modules 26 with the battery cell stack 28, for example each having three pouch battery cells 28-1, 28-2, 28-3, are shown in FIG. 2, nothing precludes the battery pack 24 from having a greater number of such modules and battery cells.

Figure 3:
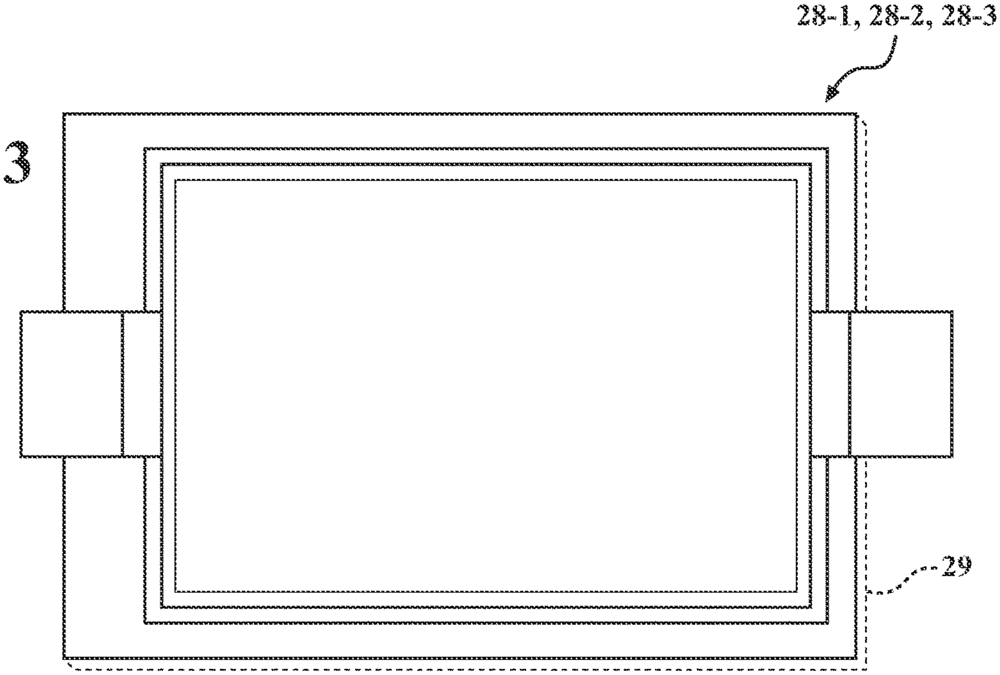
FIG. 3 is a schematic top view of a typical pouch battery cell.

A typical pouch battery cell, such as the cells 28-1, 28-2, 28-3, is illustrated in FIG. 3. Each of the pouch battery cells 28-1, 28-2, 28-3 includes a sealed enclosure or pouch 29. Walls of the pouch 29 are typically constructed from two layers of polymer sandwiching an aluminum layer, and thus provide no rigid structure to the pouch battery cell. Although not shown, a negative electrode or anode and a positive electrode or cathode of each pouch battery cell 28-1, 28-2, 28-3 are packaged and retained within the pouch 29. The anode and the cathode are typically immersed in an electrolyte (not shown) formulated to conduct ions between the two electrodes as the pouch battery cell 28-1, 28-2, 28-3 charges and discharges. The pouch 29 is designed and manufactured to maintain physical integrity and reliable performance of the subject pouch battery cell 28-1, 28-2, 28-3 under a variety of external and internal stresses, such as due to vibration and temperature fluctuations within the cell’s operating range.

Figure 8:
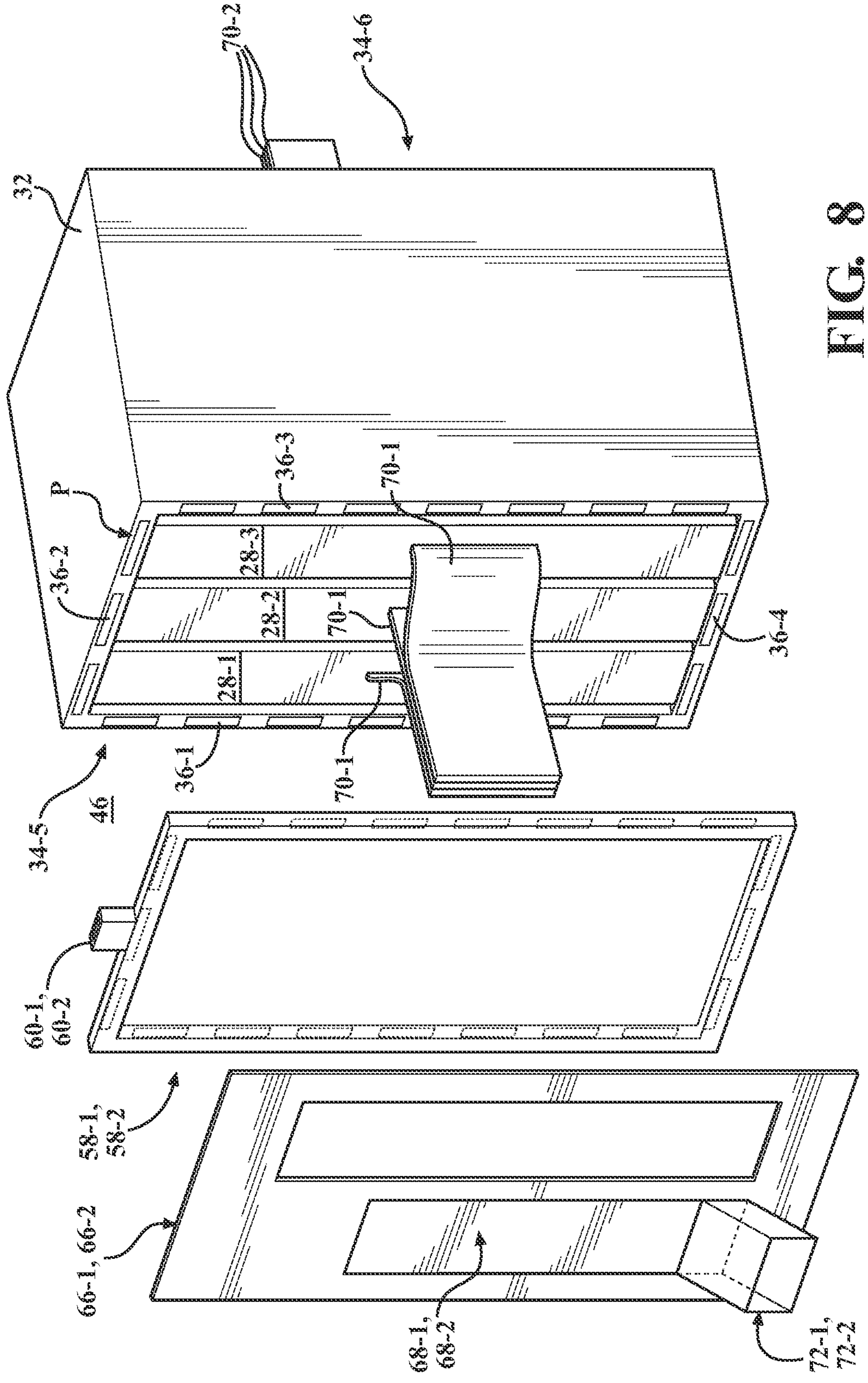
FIG. 8 is a schematic perspective front view of the battery module shown in FIG. 2, depicting an arrangement of snap-fit polymer frames arranged at the non-structural sides of the battery module container and having over-molded current collectors, according to the disclosure.

With resumed reference to FIG. 2, the battery module 26 includes a battery module container 32. The battery module container 32 is configured to house the three pouch battery cells 28-1, 28-2, 28-3 and includes a first lateral wall 34-1, a second lateral wall 34-2, a third lateral wall 34-4, and a fourth lateral wall 34-4. The first, second, third, and fourth lateral walls 34-1, 34-2, 34-3, 34-4 together establish a perimeter P of the battery module container 32 and are configured to provide structural support for the three pouch battery cells 28-1, 28-2, 28-3. Each of the first through fourth lateral walls 34-1, 34-2, 34-3, 34-4 define one or more respective coolant passages 36-1, 36-2, 36-3, 36-4. Each coolant passage 36-1, 36-2, 36-3, 36-4 is configured to receive a coolant 38 from an external coolant source 40 (shown in FIGS. 4 and 5), such as a fluid pump. As shown in FIG. 8, the battery module container 32 also includes non-structural, i.e., non-supportive, and initially open, and fifth side 36-5 and sixth side 36-6. The first through fourth lateral walls 34-1, 34-2, 34-3, 34-4 are configured to direct debris 42 and gases 44 emitted by at least one of the three pouch battery cells 28-1, 28-2, 28-3 undergoing a thermal runaway event out of the battery module container 32. For their part, the fifth side 36-5 and sixth side 36-6 are configured to eject debris 42 and gases 44 emitted by the subject pouch battery cell(s) 28-1, 28-2, 28-3 to an external environment 46.

Generally, during normal operation of the battery module 26, circulation of coolant 38 in the coolant passages 36-1, 36-2, 36-3, 36-4 in the container lateral walls 34-1, 34-2, 34-3, 34-4 is effective in absorbing thermal energy released by the first, second, and third pouch battery cells 28-1, 28-2, and 28-3 and facilitating transfer of the thermal energy out of the battery module. However, during extreme conditions, such as during a thermal runaway event, identified via numeral 48 in FIG. 2, the thermal energy released by the pouch battery cell undergoing the event, for example the first pouch battery cell 28-1, will typically be transferred to the neighboring cell, i.e., the second pouch battery 28-2. Such transfer of the energy between the cells in the battery module 26 may eventually lead to propagation of thermal energy throughout the battery module, for example on to the third pouch battery cell 28-3, leading to a thermal runaway. Accordingly, the term "thermal runaway event" generally refers to an uncontrolled increase in temperature in a battery module.

During a thermal runaway event, the generation of heat within a battery module or a battery cell exceeds the module's ability to dissipate heat, thus leading to a further increase in temperature. A thermal runaway event may be triggered by various conditions, including a short circuit within the cell, improper cell use, physical abuse, manufacturing defects, or exposure of the cell to extreme external temperatures. For example, during the thermal runaway event 48 in the first pouch battery cell 28-1, while the coolant passages 36-1, 36-2, 36-3, 36-4 in the container lateral walls 34-1, 34-2, 34-3, 34-4 continue to circulate a predetermined amount of coolant 38, the sharp increase in the thermal energy output from the first pouch battery cell 28-1 may overwhelm the energy absorption capacity of the coolant circulating proximate the subject pouch battery cell. In such an event, the temperature increase in the first pouch battery cell 28-1 may result in heightened internal pressure and a rupture 50 (shown in FIG. 2) of the cell's pouch 29, sending the hot debris 42 and gases 44 out of the affected pouch battery cell and into the battery container 32.

The container lateral walls 34-1, 34-2, 34-3, 34-4 of each module 26 are intended to withstand the rupture 50 of the pouch 29, such as of the first pouch battery cell 28-1, and direct hot debris 42 and gases 44 away from the neighboring module. For their part, the fifth and sixth sides 36-5, 36-6 facilitate ejection of the hot debris 42 and gases 44 out of the battery module container 32 to the external environment 46. Thus, the battery module container 32 is configured to control, i.e., minimize the likelihood of, propagation of the thermal runaway event 48 within the battery pack 24 by localizing the thermal runaway event in one of the battery modules and reducing transfer of high temperature debris 42 and gases 44 between the constituent battery modules 26.

Figure 6:
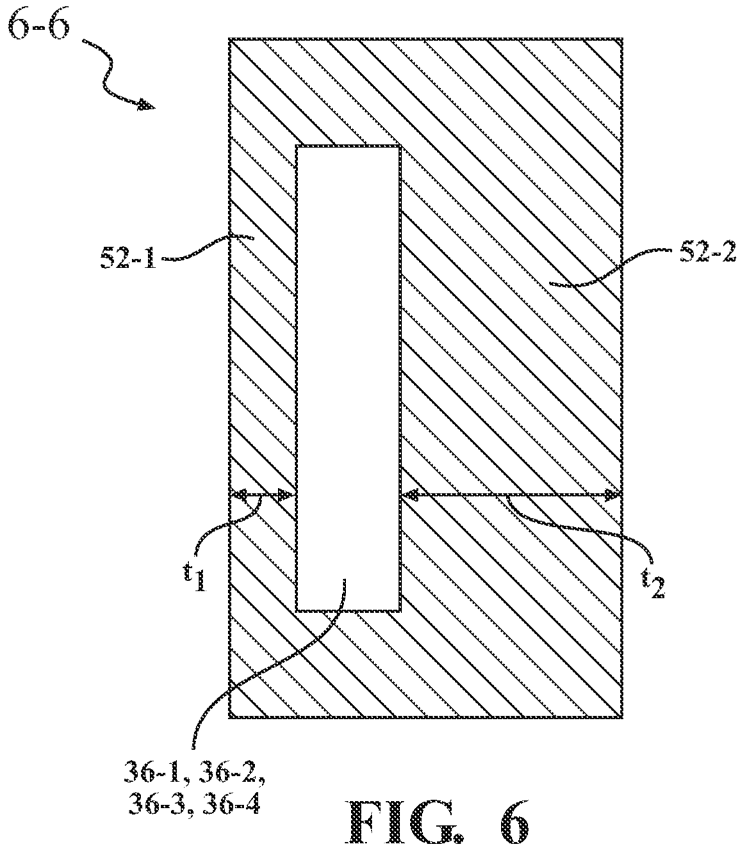
FIG. 6 is a schematic close-up view of a particular section of the battery module container first, second, third and fourth lateral walls indicated in FIG. 2, and showing relative thicknesses of inner and outer walls of the section, according to the present disclosure.
Figure 7:
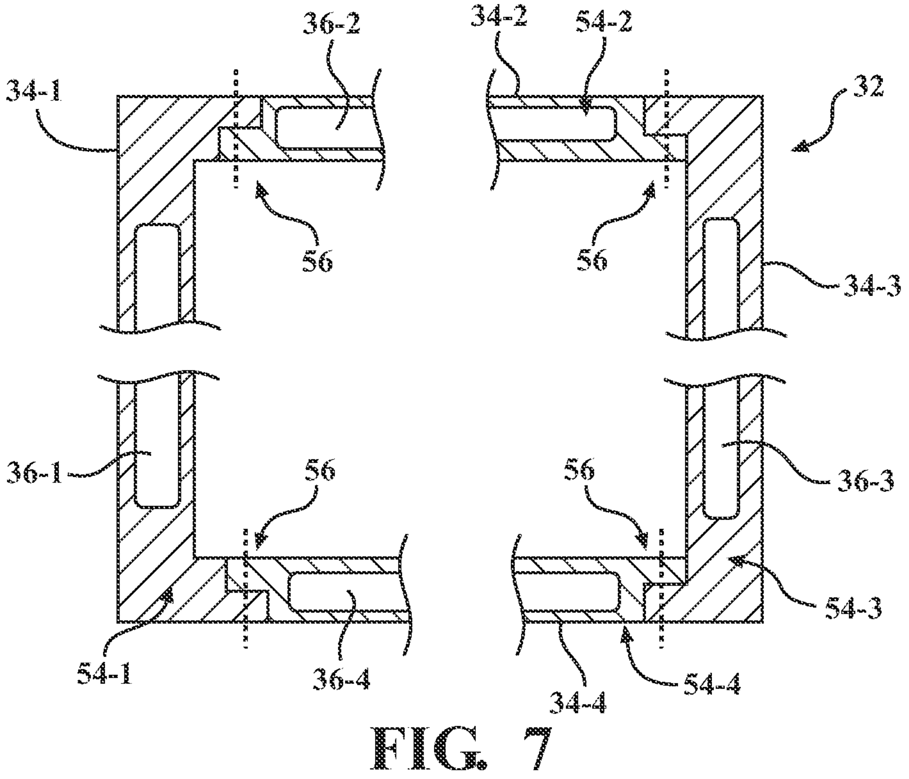
FIG. 7 is a schematic sectional side view of the battery module container shown in FIG. 2, depicting extruded laser welded subsections defining the first, second, third and fourth lateral walls, according to the present disclosure.

Each of the first, second, third, and fourth lateral walls 34-1, 34-2, 34-3, 34-4 may be characterized by a cross-section 6-6 indicated in FIG. 2 and shown in FIG. 6. As shown in FIG. 6, the cross-section 6-6 may include an inner wall 52-1 having a first thickness $t_1$ and an outer wall 52-2 having a second thickness $t_2$. The inner wall 52-1 and the outer wall 52-2 bracket or sandwich the respective coolant passage(s) in each of the first, second, third, and fourth lateral walls 34-1, 34-2, 34-3, 34-4. The first thickness $t_1$ is smaller than the second thickness $t_2$, such that the cross-section 6-6 provides enhanced cooling of the first, second, and third pouch battery cells 28-1, 28-3, 28-3 and enhanced structural integrity for the battery module container 32. As shown in FIG. 7, the battery module container 32 may include or be constructed from four joined aluminum extruded subsections 54-1, 54-2, 54-3, and 54-4. Each subsection 54-1, 54-2, 54-3, and 54-4 may define at least a part of one of the first, second, third and fourth lateral walls 34-1, 34-2, 34-3, 34-4. Each of the four aluminum extruded subsections 54-1, 54-2, 54-3, 54-4 may include a dog-leg shaped end 56 configured to match up to and interface with a mating dog-leg shaped end 56 in an adjacent subsection.

Figure 4:
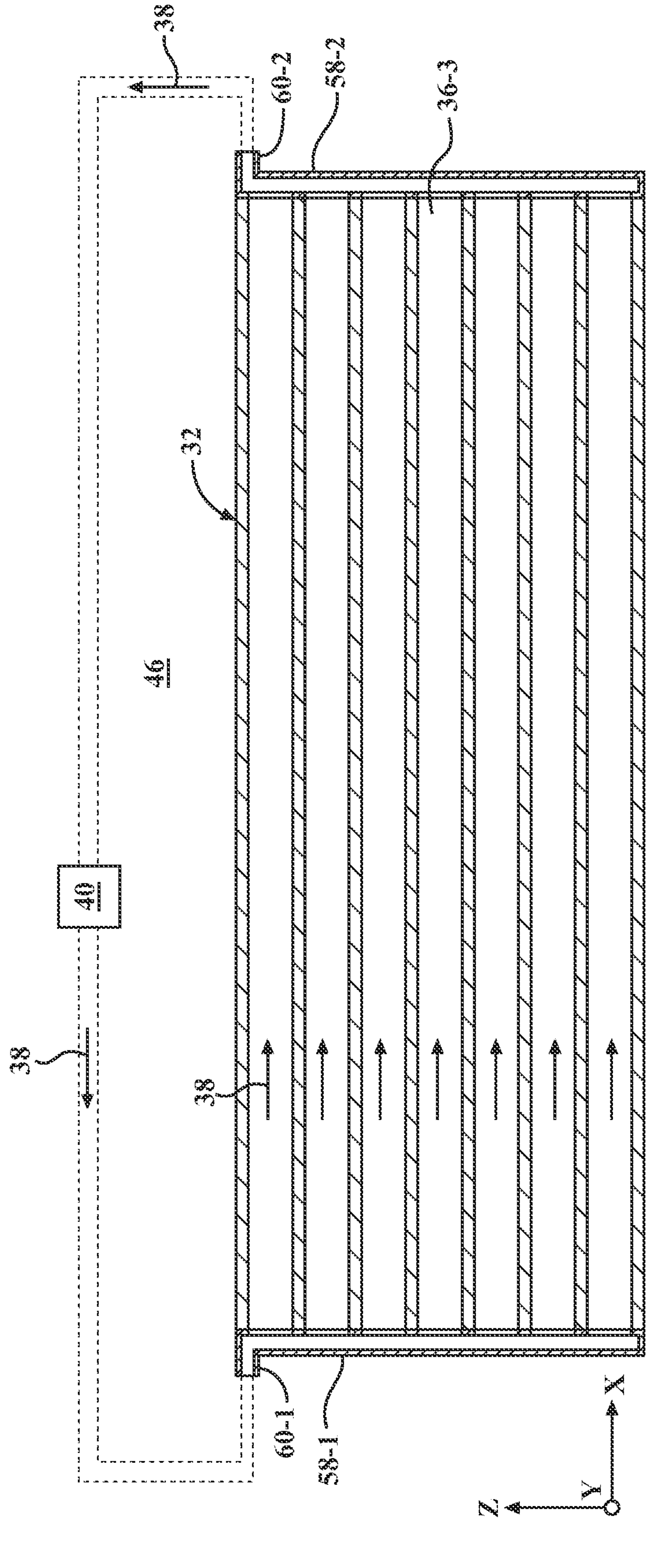
FIG. 4 is a schematic sectional side view of the battery module container shown in FIG. 2, depicting individual coolant passages within structural lateral walls of the container and inlet and outlet coolant manifolds arranged at non-structural sides of the battery module container, according to the disclosure.
Figure 5:
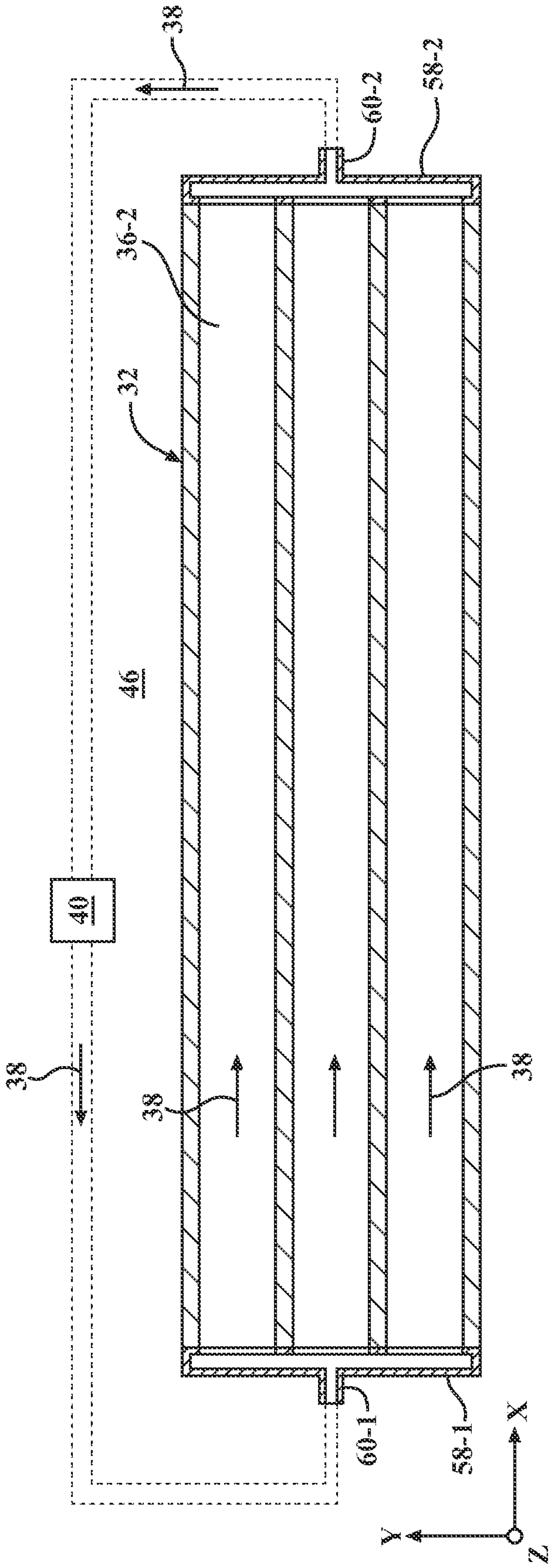
FIG. 5 is a schematic sectional top view of the battery module container shown in FIGS. 2 and 3, depicting individual coolant passages within structural lateral walls of the container and inlet and outlet coolant manifolds arranged at non-structural sides of the battery module container, according to the disclosure.

With resumed reference to FIGS. 4 and 5, the battery module 26 may also include first and second coolant manifolds 58-1, 58-2 mounted around the perimeter P of the battery module container 32 and fluidly connected to each of the first, second, third and fourth lateral walls 34-1, 34-2, 34-3, 34-4. In such an embodiment, the first coolant manifold 58-1 is configured to receive the coolant 38 from the external coolant source 40 and distribute the coolant to the coolant passage(s) 36-1, 36-2, 36-3, 36-4 in the container lateral walls 34-1, 34-2, 34-3, 34-4. The second coolant manifold 58-2 is configured to discharge the coolant 38 from the passage(s) 36-1, 36-2, 36-3, 36-4, such as to the external coolant source 40. Each of the first and second coolant manifolds 58-1, 58-2 may be laser welded to the respective first, second, third and fourth lateral walls 34-1, 34-2, 34-3, 34-4. Additionally, each of the first and second coolant manifolds 58-1, 58-2 may include a respective coolant quick-connect port 60-1, 60-2 configured to establish fluid communication with the external coolant source 40. In the battery pack 24 having a plurality of subject battery modules 26, individual first coolant manifolds 58-1 of each respective battery module 26 may be fluidly connected in series. Individual second coolant manifolds 58-2 of each respective battery module 26 may be fluidly connected in series, as well.

With resumed reference to FIG. 2, the battery module 26 may additionally include an electrically insulating, thermally conductive interface material 62 arranged between each end pouch battery cell and the adjacent lateral wall of the battery module container 32. For example, in the battery module 26 having two pouch cells, e.g., the first and second cell 28-1, 28-2, the electrically insulating, thermally conductive interface material 62 may be arranged between the first pouch battery cell 28-1 and the first lateral wall 34-1 and between the second pouch battery cell 28-2 and the second lateral wall 34-2. The battery module 26 may also include an aerogel layer 64 (shown in FIG. 2) arranged between and around the neighboring battery modules 26, as well as between adjacent battery module containers 32.

As shown in FIG. 8, the battery module 26 may further include first and second, e.g., snap-fit, polymer frames 66-1, 66-2. As shown, the first polymer frame 66-1 is fixed to, via the snap-fit feature (not shown), the non-structural fifth side 36-5 and the second polymer frame 66-2 is fixed to the non-structural sixth side 36-6 of the battery module container 32. Accordingly, in an assembled battery module 26, the fifth and sixth sides 36-5, 36-6 are covered by the respective first and second polymer frames 66-1, 66-2 without adding significant structural strength or rigidity to the battery module container 32. Furthermore, during the thermal runaway event 48, the first and/or second polymer frames 66-1, 66-2 are capable of being detached and pushed off the battery module container 32 via the pressure generated by the rupture 50 of pouch battery cell, such as the first pouch battery cell 28-1. Accordingly, the non-structural fifth and sixth sides 36-5, 36-6 provide an escape path to the external environment 46 for the emitted debris 42 and gases 44.

The battery module 26 may further include first and second current collectors 68-1, 68-2 for connection with respective first, second, and third pouch cells 28-1, 28-2, 28-3. The first current collector 68-1 may be integrated with the first polymer frame 66-1 and the second current collector 68-2 may be integrated with the second polymer frame 66-2. Specifically, the first current collector 68-1 may include an over-molded first polymer frame 66-1, while the second current collector 68-2 may include a corresponding over-molded second polymer frame 66-2. Each of the first and second current collectors 68-1, 68-2 is configured to be electrically connected and secured, such as welded or crimped, to the first, second, and third pouch cells 28-1, 28-2, 28-3.

With continued reference to FIG. 8, each of the first, second, and third pouch battery cells 28-1, 28-2, 28-3 includes a respective first tab connector 70-1 and a second tab connector 70-2. The first tab connector 70-1 is an extension of the corresponding pouch cell 28-1, 28-2, 28-3 anode and the second tab connector 70-2 is an extension of the corresponding pouch cell cathode. The first tab connector 70-1 of each of the first, second, and third pouch battery cells 28-1, 28-2, 28-3 is attached to the first current collector 68-1 and the second tab connector 70-2 of each pouch battery cell is electrically connected to the second current collector 68-2. Such an attachment may be accomplished by the first and second tab connectors 70-1, 70-2 being bent toward and fixed, such as by welding, to the respective current collector 68-1, 68-2. As shown in FIG. 8, the first and second current collectors 68-1, 68-2 may include a respective first and second terminal 72-1, 72-1 for connecting the corresponding current collector to the BUS 25.

Overall, the disclosed construction of the battery module 26, including the structure of the battery module container 32, is intended to protect neighboring pouch battery cells within the module during a thermal runaway event. Such protection is afforded by the battery module container 32 providing perimeter cooling through structural walls and using non-structural sides to channel debris and gases of the pouch battery cell undergoing a thermal runaway event away from the neighboring cells to thereby facilitate localization of the thermal runaway event in the affected cell. The design of the battery module 26 thereby limits transfer of high temperature gases and debris between the neighboring pouch battery cells and controls propagation of the thermal runaway event in the battery module.

Figure 9:
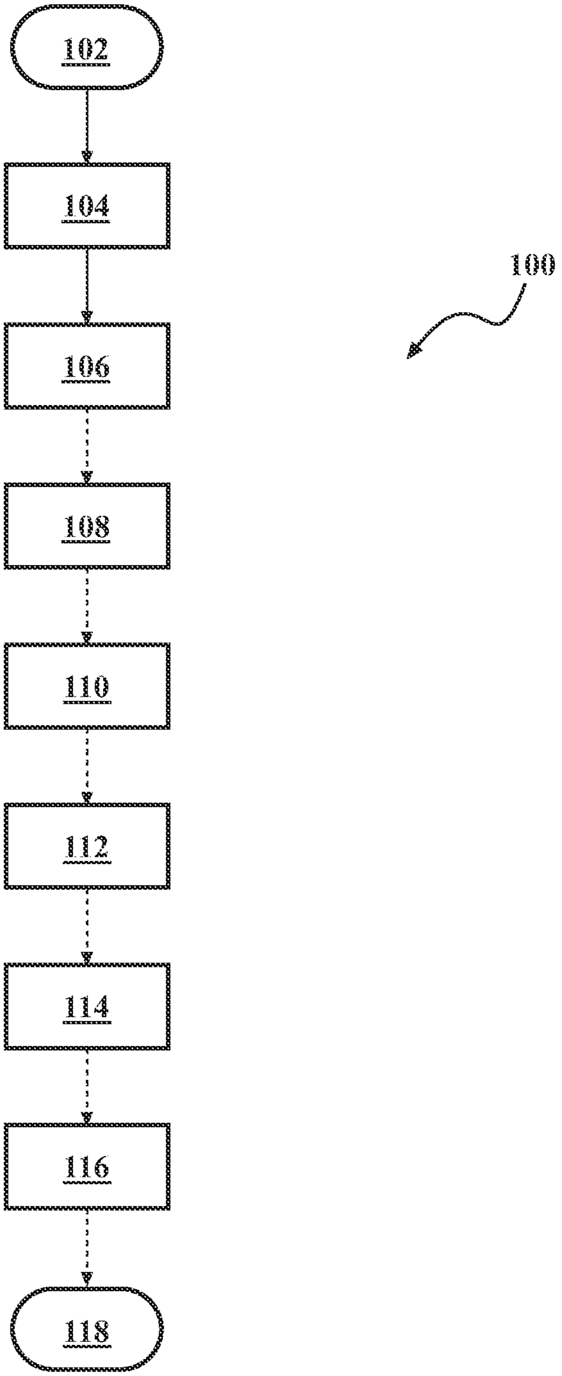
FIG. 9 illustrates a method of assembling the battery module with pouch battery cells shown in FIGS. 1-8, according to the disclosure.

A method 100 of assembling the pouch battery cell module 26 described with respect to FIGS. 1-8, is depicted in FIG. 9 and disclosed in detail below. Method 100 commences with assembling the battery module container 32. In frame 102 the method includes generating first, second, third and fourth lateral walls 34-1, 34-2, 34-3, 34-4 for the battery module container 32. As described with respect to FIGS. 1-8, each of the first, second, third, and fourth lateral walls 34-1, 34-2, 34-3, 34-4 may be characterized by the cross-section 6-6. The inner wall 52-1 and the outer wall 52-2 of the cross-section 6-6 may bracket the respective coolant passage(s) 36-1, 36-2, 36-3, 36-4 in each of the first, second, third, and fourth lateral walls 34-1, 34-2, 34-3, 34-4. Assembling the battery module container 32 includes connecting the first, second, third and fourth lateral walls 34-1, 34-2, 34-3, 34-4, wherein each of the first through fourth lateral walls define corresponding coolant passage(s) 36-1, 36-2, 36-3, 36-4.

Assembling the battery module container 32 in frame 102 may include constructing the subject first, second, third and fourth lateral walls 34-1, 34-2, 34-3, 34-4 from four joined aluminum extruded subsections 54-1, 54-2, 54-3, and 54-4. Each subsection 54-1, 54-2, 54-3, and 54-4 may define at least a part of one of the first, second, third and fourth lateral walls 34-1, 34-2, 34-3, 34-4. Assembling the battery module container 32 may additionally include matching up the respective dog-leg shaped ends 56 in adjacent aluminum extruded subsections 54-1, 54-2, 54-3, 54-4 and interfacing each dog-leg shaped end with another dog-leg shaped end to generate the battery module container structure. Thus assembled, the battery module container 32 includes non-structural, initially open, fifth and sixth sides 36-5, 36-4.

Concurrently with or preceding frame 102, in frame 104, the method includes assembling the pouch battery cell stack 28, as described above with respect to FIG. 2. Assembling the pouch battery cell stack 28 includes arranging the thermally conductive and compliant material element 30 between the first pouch battery cell 28-1 and the neighboring second pouch battery cell 28-2, as well as between the second pouch battery cell 28-2 and the neighboring third pouch battery cell 28-3. After frame 104, the method advances to frame 106. In frame 106, the method includes arranging the pouch battery cell stack 28 in the battery module container 32, such that the first, second, third, and fourth lateral walls 34-1, 34-2, 34-3, 34-4 provide structural support for the first, second, and third pouch battery cells 28-1, 28-2, 28-3. Thus arranged, the first, second, third, and fourth lateral walls 34-1, 34-2, 34-3, 34-4 become configured, i.e., constructed and positioned, to direct out of the battery module container 32 debris 42 and gases 44 emitted by one of the pouch battery cells 28-1, 28-2, 28-3 during the thermal runaway event 48. Additionally, the non-structural (open) fifth and sixth sides 36-5, 36-6 become configured to eject to the external environment 46 the debris 44 and gases 44 out of the battery module container 32.

Following frame 106, the method may proceed to frame 108. In frame 108, the method includes mounting and fluidly connecting the first and second coolant manifolds 58-1, 58-2 to each of the first, second, third and fourth lateral walls 34-1, 34-2, 34-3, 34-4. In such an assembly, the first coolant manifold 58-1 is configured to receive and distribute the coolant 38 to the coolant passage(s) 36-1, 36-2, 36-3, 36-4 in each of the first, second, third and fourth lateral walls 34-1, 34-2, 34-3, 34-4. Additionally, thus assembled, the second coolant manifold 58-2 is configured to discharge the coolant 38 from the coolant passage(s) 36-1, 36-2, 36-3, 36-4 to the external coolant source 40. Mounting the first and second coolant manifolds 58-1, 58-2 may include laser welding each subject coolant manifolds to the first, second, third and fourth lateral walls 34-1, 34-2, 34-3, 34-4. As described above with respect to FIGS. 4-5, each of the first and second coolant manifolds 58-1, 58-2 may include the respective coolant quick-connect port 60-1, 60-2 configured to establish fluid communication with the external coolant source 40.

From frame 108, method 100 may advance to frame 110, where the method includes arranging the electrically insulating, thermally conductive interface material 62 between each pouch battery cell and the adjacent lateral wall of the battery module container 32, such as, in the battery module 26 limited to the first and second pouch battery cells 28-1, 28-2, between the first pouch battery cell 28-1 and the first lateral wall 34-1 and between the second pouch battery cell 28-2 and the second lateral wall 34-2. After frame 110, the method may move on to frame 112. In frame 112, the method includes fixing the first polymer frame 66-1 to the non-structural fifth side 36-5 and the second polymer frame 66-2 to the non-structural sixth side 36-6 of the battery module container 32. Following frame 112, the method may proceed to frame 114, where the method includes electrically connecting and securing each of the first and second current collectors 68-1, 68-2 to the first, second, and third pouch cells 28-1, 28-2, 28-3.

From frame 114, method 100 may advance to frame 116, where the method includes attaching the first tab connector 70-1 of each pouch battery cell 28-1, 28-2, 28-23 to the first current collector 68-1 and attaching the second tab connector 70-2 of each pouch battery cell to the second current collector 68-2. The method may conclude in frame 118 with organizing, packaging, and/or queueing up the battery module 26 for subsequent incorporation into the battery pack 24 described above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A pouch battery cell module comprising:

a pouch battery cell stack having:

a first pouch battery cell and a neighboring second pouch battery cell; and a thermally conductive and compliant material element arranged between the first and second pouch battery cells;

a battery module container configured to house the first and second pouch battery cells and including:

first, second, third, and fourth lateral walls, each of the first through fourth lateral walls defining at least one coolant passage and configured to provide structural support for the first and second pouch battery cells and direct out of the battery module container debris and gases emitted by at least one of the first and second pouch battery cells undergoing a thermal runaway event; and non-structural fifth and sixth sides configured to eject to an external environment the debris and gases directed by the first through fourth lateral walls;

wherein:

each of the first, second, third, and fourth lateral walls is characterized by a continuous cross-section including an inner wall having a first thickness and an outer wall having a second thickness;

the inner wall and the outer wall bracket the at least one of the coolant passages; and the first thickness is smaller than the second thickness.

2. The pouch battery cell module of claim 1, wherein the battery module container includes four joined aluminum extruded subsections, each subsection defining at least a part of one of the first, second, third and fourth lateral walls.

3. The pouch battery cell module of claim 2, wherein in the cross-section of the battery module container each of the four aluminum extruded subsections includes a dog-leg shaped end configured to match up to and interface with an adjacent subsection.

4. The pouch battery cell module of claim 1, further comprising first and second coolant manifolds mounted and fluidly connected to each of the first, second, third and fourth lateral walls, wherein the first coolant manifold is configured to receive a coolant and distribute the coolant to the at least one coolant passage in each of the first, second, third and fourth lateral walls; and wherein the second coolant manifold is configured to discharge the coolant from the at least one coolant passage in each of the first, second, third and fourth lateral walls.

5. The pouch battery cell module of claim 4, wherein each of the first and second coolant manifolds is laser welded to the first, second, third and fourth lateral walls.

6. The pouch battery cell module of claim 4, wherein each of the first and second coolant manifolds includes a coolant quick-connect port configured to establish fluid communication with an external coolant source.

7. The pouch battery cell module of claim 1, further comprising an electrically insulating, thermally conductive interface material arranged between the first pouch battery cell and the first lateral wall of the battery module container and between the second pouch battery cell and the second lateral wall of the battery module container.

8. The pouch battery cell module of claim 1, further comprising first and second current collectors having corresponding over-molded first and second polymer frames, wherein the first and second current collectors are configured to be electrically connected to the respective first and second pouch cells, and wherein the first polymer frame is fixed to the non-structural fifth side and the second polymer frame is fixed to the non-structural sixth side of the battery module container.

9. The pouch battery cell module of claim 8, wherein each of the first and second pouch battery cells includes first and second tab connectors, and wherein the first tab connector of each of the first and second pouch battery cells is attached to the first current collector and the second tab connector of each of the first and second pouch battery cells is attached to the second current collector.

10. A method of assembling a pouch battery cell module comprising:

assembling a battery module container including connecting first, second, third and fourth lateral walls, and non-structural fifth and sixth sides, wherein;

each of the first through fourth lateral walls defines at least one coolant passage and is characterized by a continuous cross-section including an inner wall having a first thickness and an outer wall having a second thickness;

the inner wall and the outer wall bracket the at least one of the coolant passages; and the first thickness is smaller than the second thickness;

arranging a thermally conductive and compliant material element between a first pouch battery cell and neighboring second pouch battery cell, to generate a pouch battery cell stack; and arranging the cell stack in the battery module container, such that the first, second, third, and fourth lateral walls provide structural support for the first and second pouch battery cells and direct out of the battery module container debris and gases emitted by at least one of the first and second pouch battery cells undergoing a thermal runaway event and the non-structural fifth and sixth sides configured to eject to an external environment the debris and gases directed by the first through fourth lateral walls.

11. The method of claim 10, wherein assembling the battery module container includes joining four aluminum extruded subsections, each subsection defining at least a part of one of the first, second, third and fourth lateral walls.

12. The method of claim 11, wherein in the cross-section of the battery module container each of the four aluminum extruded subsections includes a dog-leg shaped end, and wherein assembling the battery module container additionally includes matching up the respective dog-leg shaped ends in adjacent aluminum extruded subsections and interfacing each dog-leg shaped end with another dog-leg shaped end.

13. The method of claim 10, wherein the battery module includes first and second coolant manifolds, and wherein assembling the battery module additionally includes mounting and fluidly connecting the first and second coolant manifolds to each of the first, second, third and fourth lateral walls, such that:

the first coolant manifold is configured to receive a coolant and distribute the coolant to the at least one coolant passage in each of the first, second, third and fourth lateral walls, and the second coolant manifold is configured to discharge the coolant from the at least one coolant passage in each of the first, second, third and fourth lateral walls.

14. The method of claim 13, wherein assembling the battery module additionally includes laser welding each of the first and second coolant manifolds to the first, second, third and fourth lateral walls.

15. The method of claim 13, wherein each of the first and second coolant manifolds includes a coolant quick-connect port configured to establish fluid communication with an external coolant source.

16. The method of claim 10, further comprising arranging an electrically insulating, thermally conductive interface material between the first pouch battery cell and the first lateral wall of the battery module container and between the second pouch battery cell and the second lateral wall of the battery module container.

17. The method of claim 10, wherein the battery module container includes first and second current collectors having corresponding over-molded first and second polymer frames, and wherein assembling the battery module container additionally includes fixing the first polymer frame to the non-structural fifth side and the second polymer frame to the non-structural sixth side of the battery module container;

the method further comprising electrically connecting each of the first and second current collectors to the first and second pouch cells.

18. The method of claim 17, wherein each of the first and second pouch battery cells includes first and second tab connectors, the method further comprising attaching the first tab connector of each of the first and second pouch battery cells to the first current collector and attaching the second tab connector of each of the first and second pouch battery cells to the second current collector.

* * * * *